J. H. COFFEY, Jr. & J. H. COFFEY.
TIRE MOLDING MACHINE.
APPLICATION FILED APR. 22, 1915.

1,179,898.

Patented Apr. 18, 1916.

WITNESSES.
N. R. Tyndall
E. P. Hall

INVENTORS.
J. H. Coffey
J. H. Coffey, Jr.
BY J. Edward Maybee
ATTY.

UNITED STATES PATENT OFFICE.

JOSEPH H. COFFEY, JR., AND JOSEPH H. COFFEY, OF TORONTO, ONTARIO, CANADA, ASSIGNORS OF ONE-HALF TO GUTTA PERCHA AND RUBBER, LIMITED, OF TORONTO, CANADA.

TIRE-MOLDING MACHINE.

1,179,898.

Specification of Letters Patent.

Patented Apr. 18, 1916.

Application filed April 22, 1915. Serial No. 23,182.

*To all whom it may concern:*

Be it known that we, JOSEPH HERBERT COFFEY, Jr., and JOSEPH HERBERT COFFEY, of the city of Toronto, in the county of York, Province of Ontario, Canada, subjects of the King of Great Britain, have invented certain new and useful Improvements in Tire-Molding Machines, of which the following is a specification.

This invention relates to apparatus adapted to carry out the process of molding tires set out in our copending application No. 16369 filed March 23, 1915.

In the said process we employed a sectional core, a sectional tread mold, and sectional side molds movable to and from the median plane of the core and tread mold, and at the same time radially.

Our present invention consists in the construction and arrangement of said parts and the means for actuating the same as hereinafter described and as illustrated in the accompanying drawings in which—

Figure 1:
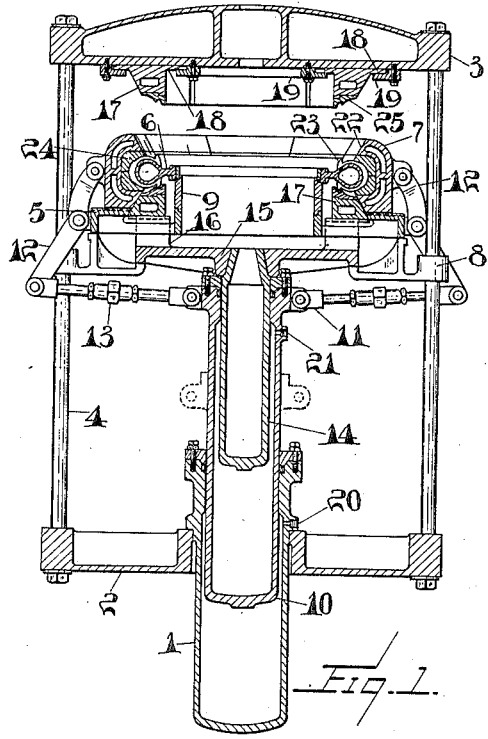
Figure 2:
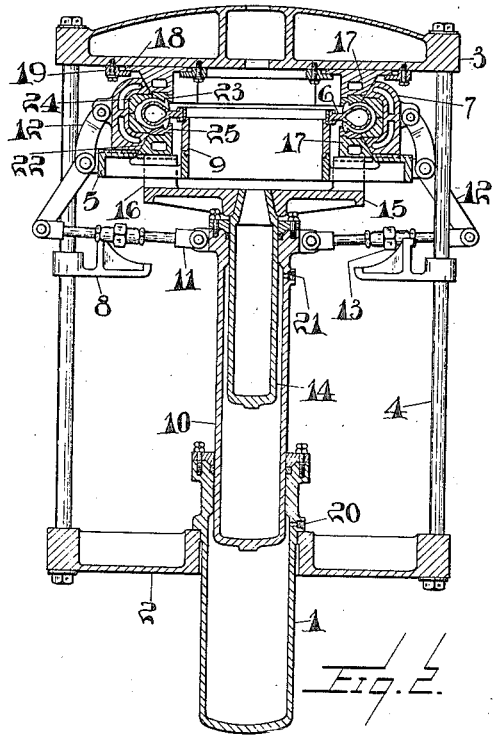
Figure 3:
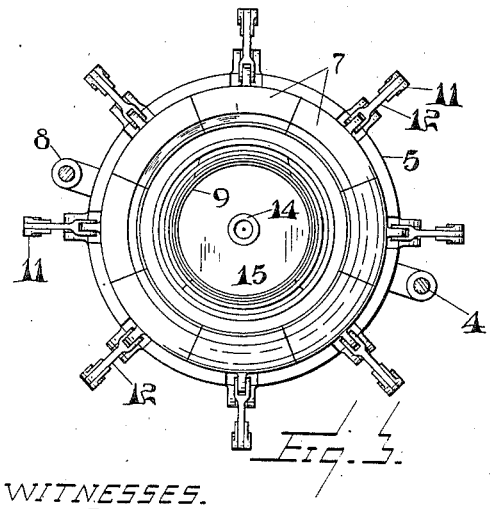
Figure 4:
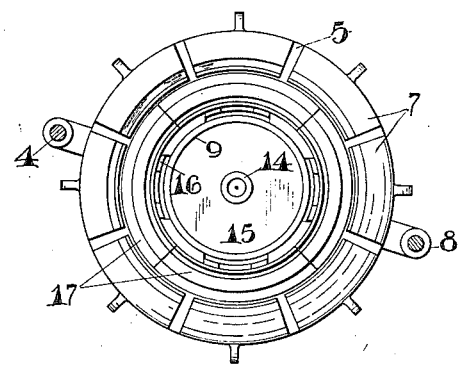

Figure 1 is a vertical section of our improved apparatus; Fig. 2 a similar view showing the parts in a different position; Fig. 3 a plan view of the same partly broken away; and Fig. 4 a plan view of the same with parts omitted and other parts in different positions from those in Fig. 3.

In the drawings like numerals of reference indicate corresponding parts in the different figures.

1 is a hydraulic cylinder to which is connected a spider 2.

3 is a crosshead or spider connected with the spider 2 by means of the rods 4.

5 is a table forming a support for the core and the tread mold 7. This table normally rests on the brackets 8 connected to the rods 4. The core 6 may be of any ordinary type, but is preferably of the sectional collapsible form described in applicants' Patent No. 1,154,843, September 28, 1915. This core rests on the annular flange 9 formed on or connected with the inner part of the table 5. The tread mold 7 is sectional also, being divided radially at eight points. Each section is movable radially of the core on the table 5.

Fitted in the cylinder 1 is the hollow piston 10. To this piston are pivotally connected the toggles 11, the other ends of which are pivotally connected with the levers 12 fulcrumed on the table 5 and having a pivotal connection at their other ends with the sections of the tread mold 7. Turnbuckles 13 are preferably provided whereby the toggles may be adjusted in length to take up wear or accurately adjust the position of the tire mold sections. It is evident that the vertical movement of the piston 10 may be utilized to radially move the sections of the tread mold 7. The hollow piston 10 serves as a cylinder for the piston 14, which is fitted therein. This piston carries the table 15 provided with the projections 16, which extend up through openings in the table 5 and serve to support the lower side mold 17. This side mold is divided into sections, preferably four in number, which sections are slidable on the projections 16 radially of the core. The crosshead 3 carries the upper sectional side mold. The sections of this mold are provided with the flanges 18, which are engaged in the guides 19 secured to the head, so that the sections of the upper side mold may be moved radially of the core.

Normally the table 15 rests on the end of the hollow piston 10 as shown in Fig. 1. The cylinder 1 is provided with the port 20, through which a fluid may be introduced or exhausted. A similar port 21 is provided in the hollow piston 10. From the construction described, it follows that if a core with a tire to be molded is placed in the machine, that by introducing a fluid into the cylinder 1, the sections of the tread mold may be brought into coöperative relationship with the tire and the core. Then, by introducing fluid into the hollow cylinder, the inner piston may be raised to bring the lower side mold into coöperative relationship with the tire and core. At the same time, the tables 5 and 15 will be simultaneously raised to bring the tire and core into coöperative relationship with the upper side mold, and the pressure being continued the tire will be properly molded. Then by retaining the pressure within the hollow piston 10 while exhausting the fluid from the cylinder 1, the side molds may be retained in coöperative relationship with the tire and core while the sections of the tread mold are radially disengaged. Subsequently, by venting pressure from both the cylinder and the hollow piston, the tables may be allowed to drop and the side molds thereby disengaged from the tire. The completed tire and the core may then be removed for curing.

It is one of our main ideas in the construction of this machine to arrange the molds and their mode of operation so that the tread mold serves to compress the tire against the tread portion of the core and draw the sides adjacent the tread toward the rim side, and to arrange the side molds so that the sides adjacent the rim are compressed against the mold and stretched from the tread, the edges being also drawn away from the tread and inwardly toward each other. To effect this, it is preferable that the tread molds extend around each side of the tire practically half way between the tread and the edges of the tire. So also, the side mold sections which, as hereinbefore described, are radially movable, are arranged so that as they move in toward the median plane of the tire, they also move inwardly radially of the tire. This is preferably arranged by forming their edges 22 on the bevel as shown, the contacting edges of the side molds being cut to a similar bevel. The movement of the sections of the side molds is therefore parallel to the direction of bevel.

The side molds, it will be noted, are suitably cut to mold the edges of the tire. In the drawings we show beaded edges 23, which are engaged by the side molds. It will be noted that the distance between the beads and the tread of the tire in the first place is less than the distance between these two points after the tire has been molded. The tire is stretched to its final form first by the action of the tread molds, which compress the tread and smooth out and press the parts of the sides adjacent the tread toward the rim side, which movement is completed by the action of the side molds which engage the beads 23 and draw them inwardly and away from the tread. This completes the smoothing out and stretching of the side walls. The purpose of this is to thoroughly stretch and smooth down the canvas fabric of the tire carcass, so as to prevent wrinkles or bulges therein, these wrinkles or bulges being a fruitful cause of blow-outs.

It will be noted that the bodies of the tread mold and side molds are made hollow so that steam may be introduced if it is desired to cure the tires in the machine. Usually, however, they will be removed and cured as set out in the application hereinbefore referred to. Preferably also, the faces 24 of the sections of the tread mold 7 and the faces 25 of the side molds 17 are made separate from the bodies of the mold so that molds may be readily changed to suit different types of tread and different styles of edges or beads as may be required.

From the above description it will be seen that we have devised a machine that will satisfactorily attain the objects of our invention as set out in the preamble of this specification.

What we claim as our invention is:

1. In tire molding apparatus, the combination of a core; a sectional tread mold movable radially of the core and adapted to mold the tread and part of the side walls of a tire; sectional side molds movable radially of the core and adapted to mold the remainder of the side walls and edges of the tire; and means for bringing said parts into and out of coöperative relationship, said parts and operating means being adapted to permit of the tread mold sections being moved out of coöperative relationship with the core while the side molds remain in coöperative relationship therewith.

2. In tire molding apparatus, the combination of a core and tread mold support; a core supported thereon; a sectional tread mold movable thereon radially of the core; side mold supports; side molds movable on said supports radially of the core; and means for moving a plurality of said supports axially of the core, and the molds radially of the core to bring the molds into and out of coöperative relationship with the core.

3. In tire molding apparatus, the combination of a core; a sectional tread mold movable radially of the core and adapted to mold the tread and part of the side walls of a tire; sectional side molds movable radially of the core and adapted to mold the remainder of the side walls and edges of the tire, the side molds and tread mold having inclined engaging surfaces whereby relative movement of the molds axially toward the core tends to move the side molds radially inward; and means for moving said molds into and out of coöperative relationship with the core.

4. In tire molding apparatus, the combination of a core and tread mold support; a core supported thereon; a sectional tread mold movable thereon radially of the core; side mold supports; side molds movable on said supports radially of the core, the side molds and tread mold having inclined engaging surfaces whereby relative movement of the molds axially toward the core tends to move the side molds radially inward; and means for moving a plurality of said supports axially of the core, and the molds radially of the core to bring the molds into and out of coöperative relationship with the core.

5. In tire molding apparatus, the combination of a hydraulic cylinder; a crosshead supported in substantially fixed relationship thereto forming an upper side mold support; a side mold carried thereon;

a hollow piston movable in said cylinder; a second piston movable in the said hollow piston; a table suitably guided forming a core and tread mold support; a core carried on said support; a sectional tread mold radially movable on said support; a table carried by said second piston having upward projections, the first mentioned table having openings therein for the passage of said projections; a complementary side mold carried on said projections; levers fulcrumed on the first mentioned table engaging the sections of the tread mold; and pivoted toggles connected with said levers and the aforesaid hollow piston to actuate said levers.

6. In tire molding apparatus, the combination of a hydraulic cylinder; a crosshead supported in substantially fixed relationship thereto forming an upper side mold support; a side mold radially movable thereon; a hollow piston movable in said cylinder; a second piston movable in the said hollow piston; a table suitably guided forming a core and tread mold support; a core carried on said support; a sectional tread mold radially movable on said support; a table carried by said second piston having upward projections, the first mentioned table having openings therein for the passage of said projections; a complementary side mold radially movable on said projections; levers fulcrumed on the first mentioned table engaging the sections of the tread mold; and pivoted toggles connected with said levers and the aforesaid hollow piston to actuate said levers, the side molds and tread mold having inclined engaging surfaces whereby relative movement of the molds axially toward the core tends to move the side molds radially inward.

7. In tire molding apparatus, the combination of a core; a sectional tread mold movable radially of the core and having its side adapted to extend substantially midway between the tread and rim side of a tire; and sectional side molds movable radially of the core and adapted to mold the remainder of the side walls and edges of the tire, the said side molds being shaped to engage beaded tire edges, said tread mold sections being adapted to be moved out of coöperative relationship with the core while the side molds remain in coöperative relationship therewith.

8. In tire molding apparatus, the combination of a core; a sectional tread mold movable radially of the core and having its side adapted to extend substantially midway between the tread and rim side of a tire; sectional side molds movable radially of the core and adapted to mold the remainder of the side walls and edges of the tire, the said side molds being shaped to engage beaded tire edges; and means for bringing said parts into and out of coöperative relationship and for moving said side molds radially inward, said means being arranged so that the side molds may be maintained in coöperative relationship with the tire and core while the tread mold sections are radially disengaged.

9. In tire molding apparatus, the combination of a core and tread mold support; a core supported thereon; a sectional tread mold movable thereon radially of the core and having its sides adapted to extend substantially half-way between the tread and rim side of the tire; side mold supports; side molds carried on said side mold supports; means for moving a plurality of said supports axially of the core to bring the side molds into and out of coöperative relationship with the core; and means for radially moving the tread mold sections, said tread mold sections being radially movable with the side molds either in coöperative or non-coöperative position.

Signed at Toronto this 13th day of April 1915, in the presence of the two undersigned witnesses.

JOSEPH H. COFFEY, Jr.
JOSEPH H. COFFEY.

Witnesses:
J. Edw. Maybee,
E. P. Hall.